(12) United States Patent
Braga et al.

(10) Patent No.: US 6,284,820 B1
(45) Date of Patent: *Sep. 4, 2001

(54) BITUMINOUS COMPOSITIONS MODIFIED WITH POLYOLEFINIC MATERIALS

(75) Inventors: Vittorio Braga, Ferrara; Emilio Martini, Sasso Marconi; Maurizio Galimberti, Milan; Enrico Albizzati, Arona, all of (IT)

(73) Assignee: Montell Technology company BV, Hoofddorp (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/900,035

(22) Filed: Jul. 24, 1997

Related U.S. Application Data

(63) Continuation of application No. 08/172,539, filed on Dec. 23, 1993, now abandoned.

(30) Foreign Application Priority Data

Dec. 28, 1992 (IT) .............................................. MI92A2975

(51) Int. Cl.[7] ................................................... C08J 95/00
(52) U.S. Cl. .............................................................. 524/70
(58) Field of Search .................................................. 524/70

(56) References Cited

U.S. PATENT DOCUMENTS

| | | |
|---|---|---|
| 4,069,181 | 1/1978 | Healy et al. . |
| 4,829,109 | 5/1989 | Ciacci et al. ........................... 524/68 |
| 5,272,236 | * 12/1993 | Lai et al. ........................ 526/348.5 |
| 5,397,843 | * 3/1995 | Lakshmanan et al. .............. 525/240 |

FOREIGN PATENT DOCUMENTS

| | | |
|---|---|---|
| 0 204 157 | 12/1986 | (EP) . |
| 0 321 189 | 6/1989 | (EP) . |
| O 329 836 | 8/1989 | (EP) . |
| 0 384 171 | 8/1990 | (EP) . |
| 0 411 626 | 2/1991 | (EP) . |

OTHER PUBLICATIONS

Kirk–Othmer, "Encyclopedia of Chemical Technology," 3rd Ed., vol. 3, p. 84.
C. Giavarini, et al., Int'l. Symposium Chemistry of Bitumens, Roma, 1991, vol. 1, p. 314.
G. J. Ray, et al., Macromolecules, 10, 4, 773 (1977).
H. H. Brintzinger, et al., J. Organomet. Chem., 228, p. 63 (1985).
F. Van Der Berg, 3rd Eurobitume, The Hague, vol. 1, p. 664 (1985).
M. Zavatti, in A. Girelli, "Petrolio," Tamburini, Milano, p. 665 (1969).

* cited by examiner

Primary Examiner—Peter D. Mulcahy
(74) Attorney, Agent, or Firm—Bryan Cave LLP

(57) ABSTRACT

The present invention relates to bituminous compositions, particularly suitable for paving and building waterproofing, comprising a bitumen and a copolymer of ethylene with propylene and/or other alpha-olefins and optionally with smaller proportion of a diene or polyene. The copolymer is besides characterized by a very low crystallinity, intrinsic viscosity higher than 1.5 dl/g and by a content of propylene units or of the alpha-olefin in form of triads comprised between 4 and 50% of the propylene or of the alpha-olefin, with at least 70% of said triads having isotactic structure.

7 Claims, No Drawings

BITUMINOUS COMPOSITIONS MODIFIED WITH POLYOLEFINIC MATERIALS

This is a continuation of U.S. application Ser. No. 08/172,539, filed December 23, 1993, now abandoned.

The present invention relates to bituminous compositions modified with new polyolefinic materials and particularly suitable for applications either of road surfacing type or building waterproofing.

It is known that bitumens employed for these applications are modified by mixing with modifying materials in order to suitably improve the properties. In the non-modified state, in fact, bitumens are easily processable and show good impermeability, but their resistance to ageing is poor and their elastic characteristics are inadequate.

In particular, materials suitable for modifying bitumens must be able to increase the softening temperature and the resistance to elastic failure at high temperatures without negatively affecting the properties at low temperatures and the processability.

Furthermore, the modifying materials must show a good compatibility degree with bitumen, in order to avoid or at least to limit the arising of segregation phenomena between the bitumen phase and the modifying phase, phenomena which could cause a premature worsening of the properties of the material. It has to be kept in mind with regard to this that the compatibility degree modifier-bitumen is not easily foreseeable because of the complex structure and chemical composition of the bitumen and for the variability depending on the starting crude material and production process.

Known modifiers for bitumen are for example homopolymer or copolymer atactic polypropylenes (A-PP), ethylene-propylene rubber (EPR) or ethylene-propylene-ethylidenenorbornene rubber (EPDM), ethylene-vinylacetate copolymer (EVA) or ethylene methylmethacrylate copolymer (EMA) and styrene copolymers such as styrene-butadiene-styrene (SBS) or styrene-isoprene-styrene (SIS).

Among these, atactic polypropylenes generally show good blendability with bitumens and improve the properties of these at low temperatures, with a slight increase of the elastic recovery, but they contribute little to increase the softening temperature and the penetration. EVA and EMA copolymers show a good blendability with bitumens and contribute to increase the softening and properties at the penetration, with fair elastic recovery and properties at the low temperatures. EPR or EPDM rubbers in many cases causes insufficiently high softening temperatures and furthermore show blending difficulties with bitumens because of their high viscosity.

SBS and SIS styrene copolymers give the bitumen elasticity at the low temperatures, but they yield bituminous compositions that are not very resistant to penetration at temperatures higher than 50–60° C.; the resistance to ageing is also limited because of the vulnerability of the unsaturated groups to the degrading action of light and atmospheric agents as well as cross-linking phenomena of the product itself.

Also known is the use of mixtures of different modifiers to modify bitumens, these mixtures being used to balance the effects of single components. European patent application EP-A-204157, for example, describes modifiers which comprise an ethylene-propylene elastomeric copolymer and optionally A-PP and/or polyethylene and/or isotactic polypropylene and/or EVA. Mixtures of modifiers described in U.S. Pat. No. 4,829,109 comprise on the contrary an ethylene-propylene copolymer, an ethylene-terpolymer, a high density polyethylene and, optionally, an EVA copolymer.

It has now been found that it is possible to obtain bituminous compositions which are particularly suitable for applications either of road surfacing type or building waterproofing using new ethylene copolymers as modifiers. The bituminous compositions obtained are particularly interesting in that they combine good elastic properties, resistance to penetration and softening together with an effective resistance to ageing.

The bituminous compositions of the present invention comprise bitumen and copolymers of ethylene with propylene and/or alpha-olefins $CH_2=CHR$, wherein R is an alkyl radical having 2–10 carbon atoms, characterized by the following properties:

i. solubility in pentane at 25° C. higher than 90%;
ii. melting enthalpy lower than 20 J/g;
iii. content of propylene or alpha-olefin units in form of triads comprised between 4 and 50% of the propylene or alpha-olefin, with at least 70% of said triads having isotactic structure;
iv. values of the product $r_1 \cdot r_2$ of the reactivity ratio of ethylene, $r_1$, and propylene or alpha-olefin, $r_2$, comprised between 0.4 and 1;
v. intrinsic viscosity higher than or equal to 1.5 dl/g and preferably comprised between 1.5 and 3.5 included.

The values of the melting enthalpy indicated under ii. correspond to a restricted crystallinity degree. The characteristic described under iv. indicates a random distribution of the ethylene and propylene units and/or of the units deriving from alpha-olefins in sections of the chain having copolymeric structure.

The combination of characteristics from i. to v. gives the copolymers of the invention valuable elasto-plastic properties; in particular, it is possible to reach a tensile strength higher than 3–4 MPa and tension set values (200%, 1 min., 25° C.) lower than 30% on the non vulcanized product.

Copolymers of the invention generally contain between 35 and 85% by mole of ethylene, between 15 and 65% by mole of propylene and/or alpha-olefins, and between 0 and 10% by mole of units deriving from dienes or polyenes. Preferably, the ethylene content is comprised between 45 and 75% by mole and the propylene and/or alpha-olefins content is comprised between 25 and 55% by mole.

The content of units from diene or polyene is generally comprised between 0 and 10% by mole, preferably between 0.5 and 2% by mole.

Preferably the copolymers have an intrinsic viscosity comprised between 1.5 and 3.5 inclusive, more preferably between 1.5 and 2.5 inclusive.

Copolymers used as modifiers in this bituminous compositions of the invention are prepared by polymerization of mixtures of ethylene with propylene and/or an alpha-olefin $CH_2=CHR$, optionally in the presence of a diene or polyene, with chiral catalysts obtained from metallocene derivatives of zirconium, such as ethylene-bis(tetrahydroindenyl)zirconium, dichloride or dimethylsilanylene-bis-(tetrahydroindenyl)-zirconium dichloride, and tetraisobutyl-alumoxane.

The preparation of the copolymers is carried out by copolymerization of mixtures of monomers, working in liquid phase consisting of propylene and/or alpha-olefin at a temperature comprised between about 40 and 50° C.

Useful alpha-olefins $CH_2=CHR$, are for example 1-butene, 1-pentene, 4-methyl-1-pentene, 1-hexene, 1-octene, 1-dodecene. Suitable dienes or polyenes are preferably selected from linear non-conjugated diolefins, such as 1,4-hexadiene, or bridged cyclic diolefins such as 5-ethylidene-2-norbornene.

For bitumens used in the compositions of the invention the materials indicated as bitumens or asphalt bitumens are meant, as described in Kirk-Othmer, "Encyclopedia of Chemical Technology", 3rd Edition, Vol 3, page 84, the two first paragraphs. Examples of bitumens are those from direct distillation (also called "Straight Run", SR bitumens) and those deriving from visbreaking (see C. Giavarini, P. De Filippis and F. Del Manso, Intnl. Symposium Chemistry of bitumens, Roma, 1991, vol I, page 314).

The preparation of the bituminous compositions of the invention can be carried out according to the known blending techniques for the mixing of bitumens with polymeric modifiers.

In one preferred method the modifiers are mixed in the preheated bitumen, at temperatures higher than the melting point of the components of the mixture. Depending on the viscosity of the bitumen and modifiers, a more or less high shear mixing apparatus are used in such a way to obtain an effective dispersion of the modifiers in the bitumen. It is possible, for example, to use a Silverson L4R mixer, according to the process described in the Examples. The mixing can also be carried out in two steps, by first preparing a bitumen/modifier masterbatch having a low content of bitumen and thereafter mixing the masterbatch in the remaining part of the preheated bitumen, according to what is described in EP-A-321189.

The bituminous composition of the present invention are particularly suitable either for road surfacing or for building waterproofing, and generally for waterproofing coating of wide surfaces. The composition can be used for example as materials for roofs in the "roofing industry" field and in the preparation of waterproof blankets. The modification of bitumens according to the invention is in fact effective in improving their elastic behaviour, the resistance to penetration and the softening temperature and allows in an established way the range of characteristics more suitable for the single applications to be obtained.

A further advantage consists in the good dispersibility/compatibility of the ethylene copolymers of the invention with the bitumen, which allows the performances to be maintained for long periods of time and therefore an effective resistance to ageing.

The type and the amount of copolymer to be used as modifier in the bituminous compositions of the invention is selected, according to standards known to those skilled in the art, as a function of the requested performance for the application cation field in which the compositions are used. The selection of the type and amount of modifier must also take into account the particular environment conditions (for example the highest and lowest temperature) under which the bituminous compositions of the invention are used.

Generally, for the compositions to be employed in road surfacing the copolymer is used between 3 and 9% by weight of the total, whereas for waterproof blankets the percentages vary between 3 and 20% by weight. Amounts; of copolymer out of the indicated ranges can be used without: falling out of the meaning of the present invention.

Moreover, if requested, other types of modifiers known in the art can be added to the bituminous compositions of the invention in order to further improve their properties. For example, the addition of suitable amounts of an isotactic polypropylene can be of use to further increase the softening temperature and the resistance to deformation of the material.

Methods for Characterizing the Copolymers

The content of the bound ethylene is determined by Infrared Analysis.

The solubility in pentane (characteristic i.) is determined by the following method: 2 g of polymer are placed in 250 ml of pentane; this is heated to boiling under stirring for 20 minutes and thereafter is allowed to cool to 25° C. under stirring.

After 30 minutes it is filtered on folded filter; after drying under vacuum the portion of insoluble polymer is determined.

The thermal behaviour of the copolymer is analyzed on a sample obtained by polymerization by Differential Scanning Calorimetry (DSC) according to the following method: first heating scanning between $T_1=20°$ C. and $T_2=180°$ C. at 20° C./min; cooling to 20° C./min and second heating Scanning according to the same modalities as the first one. The melting enthalpy to which is referred under ii. is that measured during the first heating scanning.

The content of propylene or alpha-olefin units in form of triads is determined by $^{13}$C-NMR with reference to the methine $T_{\beta\beta}$, as reported in "G. J. Ray, P. E. Johnson, J. R. Knox, Macromolecules, 10, 4, 773 (1977)". Percentage values indicated under iii, are referred to the total propylene or alpha-olefin content.

The percentage content of triads having isotactic structure indicated under iii. is determined by $^{13}$C-NMR applying the following formula:

$$\% \, Iso = (A[T_\beta]_{mm})/(A[T_{\beta\beta}]_{mm} + A[T_{\beta\beta}]_{mr} + A[T_{\beta\beta}]_{rr})$$

wherein A is the surface subtended to peaks relating to tertiary carbon atoms ($T_{\beta\beta}$) and subscripts mm, mr and rr indicate the isotactic, heterotactic and syndiotactic triads respectively.

The product of the reactivity ratios indicated under iv. is calculated according to the following formula:

$$r_1 \cdot r_2 = 1 + f \cdot (x+1) - (f+1) \cdot (x+1)^{1/2}$$

wherein:

$r_1$=reactivity ratio of ethylene;

$r_2$=reactivity ratio of propylene or alpha-olefin;

f=(moles of ethylene/moles of propylene or alpha-olefin)$_{copolymer}$;

x=ratio between the propylene or alpha-olefin percentage in two or more consecutive units and percentage of separate propylene or alpha-olefin.

The intrinsic viscosity is determined according to ASTM D-2587 at 135° C. and in tetrahydronaphthalene.

The following examples are given to illustrate the invention and are not to be considered as limitative to the meaning of the invention itself.

EXAMPLES

Method for the Preparation of the Catalytic System

Tetraisobutylalumoxane (TIBAO) has been prepared according to Example 2 reported in EP-A-384171. Ethylene-bis tetrahydroindenyl)zirconium dichloride (EBTHIZrCl$_2$) has been prepared following the method described in "H. H. Brintzinger et al., J. Organomet. Chem., 288, page 63, (1985)".

Toluene has been added to a weighed amount of EBTHIZrCl$_2$ at the rate of 2 ml for each metallocene mg. To this solution a toluene solution of TIBAO has been added in such an amount to obtain the molar ratio Al/Zr and the Al molar concentration reported in Table 1. The solution has been kept under stirring at the temperature and for the time periods reported in Table General Polymerization Method A 4 litre steel autoclave provided with stirrer, manometer, temperature indicator, feeding system for the catalysts, feeding lines for monomers and thermostating jacket has been used. Into the autoclave, degassed by washing with propylene, 2 l. of propylene, hydrogen until a 0.1% molar concentration in gas phase in the final mixture has been reached and ethylene up to the desired pressure at 50° C., have been introduced; thereafter, a toluene solution containing the catalytic system and prepared according to the above reported modalities has been injected into the autoclave.

The polymerization has been carried out at 50° C. keeping the total pressure constant by feeding ethylene. The polymerization conditions have been reported in Table 2. At the end of the polymerization, after the unreacted monomer has been removed, the polymer has been dried under vacuum.

Method for the Characterization of Bitumens and Bituminous Composition

The characteristics reported in the examples have been determined according to the following methods:

| | |
|---|---|
| Asphaltene content | IP-143 |
| Penetration (PEN) | ASTM D-5 |
| Softening temperature Ring & Ball (R & B) | ASTM D-36 |
| Ductility (Elastic recovery) | ASTM D-133 (modified) |
| Stability | ASTM D-36 |
| Ageing | ASTM D-2872 |

The bitumen composition has been characterized, not only by the content of asphaltenes, but also measuring the percentage of aromatic carbon ($C_{ar}$) and aromatic hydrogen ($H_{ar}$) by NMR analysis.

As to the ductility tests the method ASTM D-133 has been modified. Tests have been carried out al 10° C., by subjecting the specimen to a 20 cm elongation, cutting it in the middle and measuring the dimensional recovery after 1 hour (see F. Van Der Berg, 3rd Eurobitume, The Hague, Vol. I, page 664 (1985)).

Specimens of mixtures bitumen-modifier employed for the stability test have been prepared by filling an aluminium tube (height 12 cm, diameter 2 cm) with the bituminous composition, keeping the filled tube vertical for 5 days at 140° C., and then cutting the tube in an upper and in a lower part. The stability test has been carried out by a penetration test on each of the two parts.

In ageing tests, the percentage changes of the softening temperature R & B and of the penetration in comparison with the values of the starting specimens have been measured.

Values of the Penetration Index (PI) reported in the following examples have been calculated according to the Pfeiffer and Van Doormal formula (see M. Zavatti, in A. Girelli, "Petrolio", ed. Tamburini, Milano, Page 665 (1969):

$$(\log 800 - \log PEN)/(R\&B - 25) = (1/50)\,[(20-IP)/(10-IP)]$$

wherein PEN is expressed in 0.1 millimetre and R&B in ° C. The value of the expression which appears at the left-hand side indicates the thermal sensibility of the properties of the bituminous composition.

Method for the Preparation of the Bituminous Composition

Bitumen-modifier compositions containing 6% by weight of modifier, calculated on the total weight, have been prepared using a Silverson L4R mixer provided with homogenizing head and operating at 4000 revolutions per minute. The mixing of bitumen with the modifier has been carried out by introducing the homogenising head into the bitumen (500 g) preheated at 160° C. and inserted into a heating cowling thermostated at 180° C. After having reached the temperature of 180° C. over 10 minutes, the modifier was added and the mixing was continued for three hours. Specimens employed for characterization tests have been prepared immediately after the end of the mixing and were stored at room temperature or in refrigerator.

EXAMPLES 1–6

Ethylene-propylene copolymers containing from about 50 to about 60% by weight of ethylene and having intrinsic viscosity 1.6, 1.8 and 2.4 dl/g have been prepared according to the above described process (Copolymers A, B and C, see Table 1).

From NMR analysis the copolymers obtained showed a content of propylene units in form of triads comprised between 15 and 20% and a content of these triads having isotactic structure higher than 95%. Table 2 reports the characteristics of the copolymers.

Characteristics of bitumens used in the examples are reported in Table 3. The bitumen SR is a bitumen obtained by direct distillation (SR=Straight Run), whereas the bitumen VB is a visbreaking bitumen. In comparison with the bitumen SR, the bitumen VB shows a higher content of asphaltenes and aromatic carbon (NMR) and lower parafinity.

Copolymers have been mixed with SR and VB bitumens according to the above described method. The characteristics of the bituminuos composition obtained from Copolymers A and C (Examples 1–4) are reported in Table 4. The composition prepared by mixing the copolymer B with SR and VB bitumens, examples 5 and 6 respectively, showed characteristics comparable with those obtained from the Copolymer A (Examples 3 and 4 respectively).

TABLE 1

Preparation of the catalytic system and polymerization

| Copolymer | Zr (mmols $10^{-3}$) | TIBAO (mmols Al) | Al/Zr (ratio moli) | Preparation of the catalyst | | | | Polymerization | | | | | | |
|---|---|---|---|---|---|---|---|---|---|---|---|---|---|---|
| | | | | Al (mmols/l) | Al ([M]) | T (° C.) | t (min) | $C_2$ liq. phase (% wt.) | $C_2$ press. (bar) | $H_2$/gas (mol %) | P tot. (bar) | t (min) | yield (g) | Activity $Kg_{pol}/g_{Zr}$ |
| A | 4.69 | 4.75 | 1013 | 1.70 | 0.91 | 20 | 8 | 21.7 | 18.5 | 0.20 | 38.0 | 240 | 520 | 1216 |
| B | 9.38 | 19.0 | 2026 | 7.21 | 1.90 | 20 | 8 | 18.0 | 15.2 | 0.10 | 34.8 | 240 | 760 | 889 |
| C | 4.69 | 9.5 | 2026 | 3.61 | 0.20 | 20 | 50 | 18.0 | 15.2 | — | 34.8 | 240 | 815 | 1905 |

TABLE 2

Characteristics of copolymers

| Copolymer | $C_2$ (% b.w.) | I.V. (dl/g) | DSC 1st Melting peak | | DSC 2nd melting peak | | Solubility in pentane (% b.w.) |
|---|---|---|---|---|---|---|---|
| | | | T melting (°C.) | H melting (J/g) | T melting (°0 C.) | H melting (J/g) | |
| A | 58.0 | 1.6 | 41.0 | 5.1 | — | — | 100 |
| B | 49.8 | 1.8 | 42.0 | 4.9 | 91.2 | 10.4 | 100 |
| C | 57.5 | 2.4 | 44.0 | 2.6 | 120.0 | 2.9 | 100 |

TABLE 3

Characteristics of bitumens

| BITUMES | SOFTENING R & B (°C.) | PENETRATION PEN (1/10 mm) | PENETRATION INDEX IP | ELASTIC RECOVERY (%) | AGEING R & B (Variazione %) | AGEING PEN (Variazione %) | ASPHALTENES (% Peso) | COMPOSITION NMR $C_{ar}$ | COMPOSITION NMR $H_{ar}$ |
|---|---|---|---|---|---|---|---|---|---|
| SR | 44.5 | 133 | 0.0 | 10.0 | +9.0 | −45.0 | 7.0 | 30.0 | 7.8 |
| VB | 40.0 | 157 | 1.1 | 7.5 | +35.0 | −61.0 | 16.7 | 37.5 | 10.5 |

TABLE 4

Characteristics of the composition Bitumen-copolymer

| EXAMPLE | BITUMEN | COPOLYMER | SOFTENING R & B (°C.) | PENETRATION PEN (mm/10) | PENETRATION INDEX IP | ELASTIC RECOVERY (%) | STABILITY PEN upper (mm/10) | STABILITY PEN lower (mm/10) | AGEING R & B (Variation %) | AGEING PEN (Variation %) |
|---|---|---|---|---|---|---|---|---|---|---|
| 1 | SR | A | 58 | 56 | 0.9 | 75 | 60 | 50 | +16.4 | −30 |
| 2 | VB | A | 63 | 49 | 1.6 | 65 | 72 | 59 | +8.7 | −33 |
| 3 | SR | C | 59 | 57 | 1.2 | 85 | 93 | 47 | — | — |
| 4 | VB | C | 63 | 59 | 2.1 | 10 | 66 | 56 | — | — |

What is claimed is:

1. Bituminous composition consisting of a bitumen and a copolymer of ethylene with propylene and/or alpha-olefin $CH_2=CHR$,, wherein R is an alkyl radical containing 2–10 carbon atoms, and a diene or polyene, said copolymer containing from 35 to 85 mol % of ethylene, from 15 to 65 mol % of propylene and/or alpha-olefin, and from 0–10% by moles of dienes or polyenes, said copolymer being prepared by polymerization of mixtures of ethylene, propylene and/or alpha-olefin, and diene or polyene with chiral catalysts obtained from metallocene derivatives of zirconium and having the following properties:
  i. solubility in pentane at 25° C. higher than 90%;
  ii. melting enthalpy lower than 20 J/g;
  iii. content of propylene or alpha-olefin units in the form of triads of from 4 to 50% of the propylene or alpha-olefin, with at least 70% of said triads having isotactic structure;
  iv. values of the product $r_1 \cdot r_2$ of the reactivity ratio of ethylene, $r_1$, and propylene or alpha-olefin, $r_2$, of from 0.4 to 1; and
  v. intrinsic viscosity at 135° C. in tetrahydronaphthalene higher than or equal to 1.5 dl/g.

2. Bituminous composition according to claim 1, wherein the copolymer contains from 45 to 75% by moles of ethylene, from 25 to 55% by moles of propylene and/or alpha-olefin and up to 2% by mole of units deriving from the diene or polyene.

3. Bituminous compositions according to claim 1, wherein the copolymer has an intrinsic viscosity of from 1.5 to 3.5 dl/g.

4. Bituminous composition according to claim 1, wherein the copolymer has an intrinsic viscosity of from 1.5 to 2.5 dl/g.

5. Bituminous compositions according to claim 1, comprising the copolymer in amounts from 3 to 20% by weight of the composition.

6. Bituminous compositions according to claim 1, comprising the copolymer in amounts from 3 to 9% by weight of the composition.

7. Bituminous composition consisting of a bitumen and a copolymer of ethylene with propylene and/or alpha-olefin $CH_2=CHR$, wherein R is an alkyl radical containing 2–10 carbon atoms, and a diene or polyene, said copolymer containing from 35 to 85 mol % of ethylene, from 15 to 65 mol % of propylene and/or alpha-olefin, and from 0–10% by moles of units deriving from dienes or polyenes, said copolymer being prepared by polymerization of mixtures of ethylene, propylene and/or alpha-olefin, and diene or polyene with a catalyst obtained from a chiral zirconium metallocene compound selected from ethylene-bis (tetrahydroindenyl) zirconium dichloride, dimethylsilanylene -bis(tetrahydroindenyl) zirconium dichloride, and tetraisobutyl alumoxane, said copolymer having the following properties:

i. solubility in pentane at 25° C. higher than 90%;

ii. melting enthalpy lower than 20 J/g;

iii. content of propylene or alpha-olefin units in the form of triads of from 4 to 50% of the propylene or alpha-olefin, with at least 70% of said triads having isotactic structure;

iv. values of the product $r_1 \cdot r_2$ of the reactivity ratio of ethylene, $r_1$, and propylene or alpha-olefin, $r_2$, of from 0.4 to 1; and v. intrinsic viscosity at 135° C. in tetrahydronaphthalene higher than or equal to 1.5 dl/g.

* * * * *

UNITED STATES PATENT AND TRADEMARK OFFICE
CERTIFICATE OF CORRECTION

PATENT NO.    : 6,284,820 B1
DATED         : September 4, 2001
INVENTOR(S)   : Vittorio Braga et al.

It is certified that error appears in the above-identified patent and that said Letters Patent is hereby corrected as shown below:

<u>Tilte page,</u>
Item [56], References Cited, OTHER PUBLICATIONS, please insert -- Chemical Abstracts, Vol. 98, No. 20, 1983, Columbus Ohio, US; abstract No. 162279 --.

Signed and Sealed this

Twenty-fifth Day of June, 2002

Attest:

JAMES E. ROGAN
Attesting Officer
Director of the United States Patent and Trademark Office